United States Patent
Brower et al.

(10) Patent No.: US 7,675,549 B1
(45) Date of Patent: Mar. 9, 2010

(54) IMAGING ARCHITECTURE FOR REGION AND TIME OF INTEREST COLLECTION AND DISSEMINATION

(75) Inventors: Bernard V. Brower, Webster, NY (US); Robert D. Fiete, Fairport, NY (US); Theodore A. Tantalo, Rochester, NY (US); Paul R. Shelley, Brockport, NY (US); Richard W. Lourette, Fairport, NY (US); Roddy Shuler, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 455 days.

(21) Appl. No.: 11/635,940

(22) Filed: Dec. 8, 2006

(51) Int. Cl.
 *H04N 5/232* (2006.01)
 *H04N 7/18* (2006.01)
(52) U.S. Cl. .................... 348/211.3; 348/157
(58) Field of Classification Search ............. 382/240; 348/211.99, 211.3, 143, 157
 See application file for complete search history.

(56) References Cited

U.S. PATENT DOCUMENTS

| 6,711,297 | B1 * | 3/2004 | Chang et al. ............ 382/240 |
| 7,116,833 | B2 | 10/2006 | Brower et al. |
| 7,124,427 | B1 * | 10/2006 | Esbensen ............... 348/159 |
| 7,440,626 | B2 * | 10/2008 | Kong et al. ............. 382/232 |
| 2002/0018072 | A1 * | 2/2002 | Chui ..................... 345/667 |
| 2002/0135678 | A1 * | 9/2002 | Bacus et al. ............ 348/143 |
| 2005/0074174 | A1 * | 4/2005 | Ishikawa ................ 382/232 |
| 2006/0168350 | A1 * | 7/2006 | Ishiyama et al. ........ 709/247 |

* cited by examiner

*Primary Examiner*—Jason Whipkey
(74) *Attorney, Agent, or Firm*—RatnerPrestia

(57) ABSTRACT

A server fulfills region and time of interest (RTI) requests for images from multiple users. The server includes a receiver for receiving a RTI request from a user, a processor for assembling a compressed image based on the RTI request, and a transmitter for transmitting the compressed image to the user. The processor is configured to extract a first portion of the compressed image from a local storage device. If the first portion is insufficient to fulfill the RTI request, the processor is configured to request a second portion of the compressed image from another server, and combine the first and second portions of the compressed image to fulfill the RTI request from the user. The compressed image includes an image compressed by a JPEG 2000 compressor.

19 Claims, 17 Drawing Sheets

IMAGING ARCHITECTURE FOR REGION AND TIME OF INTEREST COLLECTION AND DISSEMINATION

FIELD OF THE INVENTION

The present invention relates, in general, to collecting and disseminating images to multiple users. More specifically, the present invention relates to a system and method for collecting image data and disseminating image data to multiple users, simultaneously and in real time, based on region and time of interest (RTI) requests from each user.

BACKGROUND OF THE INVENTION

Conventional digital camera collection architectures collect images, one at a time, to satisfy a user requirement. As the breadth of user requirements widens, the camera is designed to collect images with various trade-offs. For overhead surveillance systems, the users prefer high-resolution images covering a very large field-of-view (FOV) at video rates. Unfortunately, downlink bandwidth is generally limited, which prohibits the camera from capturing and downlinking very large FOVs at high resolutions and at video rates. The camera collection architecture is designed, therefore, to allow FOV, frame rate, and resolution to be traded. The requests by the different users are prioritized in order of importance and the camera is configured to first capture the image data for the user with the highest priority. To increase flexibility a zoom lens may be added that enables the user to trade between resolution and FOV.

If two users have different data requirements from the same camera at the same time, the camera cannot accommodate both users simultaneously. A decision needs to be made as to which user has priority. For example, if one user requires a large area imaged at the cost of lower resolution, while another user requires a high resolution at the cost of a smaller area, both users cannot be satisfied simultaneously. In addition, each user cannot independently control the image collection process, without impacting the images requested by the other user. Increasing both the FOV and resolution creates bandwidth, storage and processing problems for both users.

With advancement in processing power, digital imaging sensors and storage devices, paying for collecting, storing, and processing images is now significantly cheaper than paying for individual camera collections and dissemination. For example, when televising a sporting event, there are several cameras viewing different locations at different angles. Each camera may have a different task (for example: follow the quarterback, follow the running back). There are also several hundred newspaper photographers collecting still imagery that are viewing different events on the sporting field. Paying for all these different camera collections is expensive.

As the technology of imaging becomes cheaper, a person may be replaced with a set of imaging systems that collects data at the same resolution over a greater area of view. For example, a blimp may collect an entire football field at ¼ inch resolution (approximately 17,280x8,640 pixels). A television controller may select the HDTV region (1,920x1,080 pixels) and time of interest before the signals are broadcast. The imagery may also be stored, so that if the television controller misses a critical part of a football play, he may go back in time and select a new region of interest for a replay broadcast.

It is probably cheaper to place multiple sensors or cameras in one imaging system, collect data over a large FOV and select smaller regions of the FOV for dissemination to an end user, as compared to the cost of having several cameramen pointing individual cameras to capture multiple scenes on the football field. Similarly, it is cheaper to place multiple cameras in one imaging system for collecting data over a large FOV in situations pertaining to security, where a region of interest may be selected based on the occurrence of an event (for example: door opening, cash register opening, loud noise, bright flash, or activation of a panic button). Multiple cameras for viewing a large FOV may also be efficiently used in border security situations, where regions of interest may be identified by motion sensors or IR signatures. Such multiple cameras having a large FOV may also be efficiently used in reconnaissance systems that require persistent surveillance of a scene.

The present invention may advantageously be used in all of the above described situations. As will be explained, present invention uses compression technology and intelligent bandwidth management within the camera architecture. This allows multiple users to simultaneously view different image data, in real time, at an acceptable downlink bandwidth, without impacting image data requested by other users.

SUMMARY OF THE INVENTION

To meet this and other needs, and in view of its purposes, the present invention provides a server for fulfilling region and time of interest (RTI) requests for images from multiple users. The server includes a receiver for receiving a RTI request from a user, a processor for assembling a compressed image based on the RTI request, and a transmitter for transmitting the compressed image to the user. The processor is configured to extract a first portion of the compressed image from a local storage device. If the first portion is insufficient to fulfill the RTI request, the processor is configured to request a second portion of the compressed image from another server, and combine the first and second portions of the compressed image to fulfill the RTI request from the user. The compressed image includes an image compressed by a JPEG 2000 compressor, and the server includes a JPEG 2000 interactive protocol (JPIP) module for communicating with the user.

The RTI request includes at least one region of an image having a hierarchical order of resolution and a hierarchical order of quality. The processor of the server is configured to combine the first and second portions of the compressed image for including the at least one region with the order of resolution and the order of quality. Moreover, the other server is configured to receive image data from a capture device, and provide the image data from the capture device as the second portion of compressed data. The other server is (a) directly connected to the capture device, (b) configured to obtain image data directly from the capture device, and (c) configured to compress the image data using JPEG 2000 protocol.

Another embodiment of the present invention is a system for fulfilling RTI requests from multiple users. The system includes at least two separate servers, namely first and second servers. The first server is configured to communicate with an imaging capture device and compress image data. The second server is configured to communicate with the first server and at least one user. A processor is disposed in the second server for assembling a compressed image based on an RTI request from a user. The processor is configured to extract a first portion of the compressed image from a local storage device. If the first portion is insufficient to fulfill the RTI request, the processor is configured to request a second portion of the compressed image from the first server, and combine the first and second portions of the compressed image to fulfill the RTI request. The processor is configured to add a header field to the combined first and second portions of the compressed image. The first server is (a) directly connected to the capture device, (b) configured to obtain image data directly from the capture device, and (c) configured to compress the image data using JPEG 2000 protocol.

The RTI request may include a geographic location of a region of interest, and the processor is configured to select at least one region of an image corresponding to the geographic location of the region of interest. The RTI request may also include a request for image data of a moving target, and the processor is configured to select at least one region of an image corresponding to the image data of the moving target.

Yet another embodiment of the present invention is a method for fulfilling RTI requests for images from multiple users. The method includes the steps of (a) receiving a RTI request from a user; (b) assembling a compressed image based on the RTI request; and (c) transmitting the compressed image to the user. Step (b) of the present invention includes (i) extracting a first portion of the compressed image from a storage device, and (ii) requesting a second portion of the compressed image from another server, if the first portion is insufficient to fulfill the RTI request, and (iii) combining the first and second portions of the compressed image to fulfill the RTI request from the user. Step (b) of the present invention includes assembling the compressed image in a JPEG 2000 format, and step (c) includes transmitting the compressed image using a JPEG 2000 interactive protocol (JPIP) module for communicating with the user. The step of requesting the second portion of the compressed image from another server includes (i) receiving image data, in the other server, from a capture device, (ii) compressing, in the other server, the image data from the capture device as the second portion of compressed image, and (iii) receiving from the other server the second portion of the compressed image.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
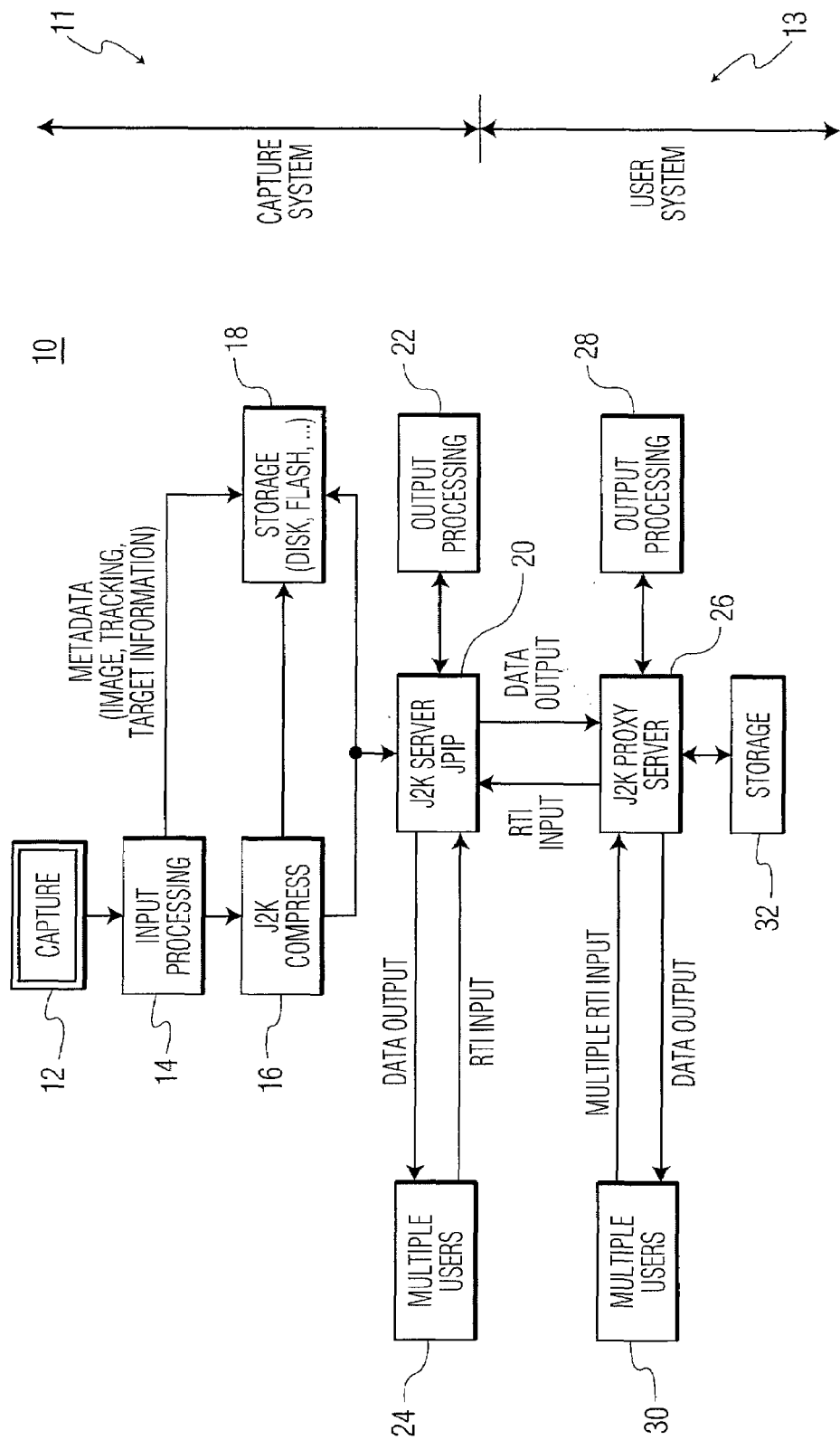
FIG. 1 is a system for capturing image data, compressing the image data and repackaging the compressed image data, in order to fulfill RTI requests from multiple users, in accordance with an embodiment of the present invention.

Referring to FIG. 1, there is shown collection and dissemination system 10 including a capture system and a user system. The capture system is shown generally designated as 11 and the user system is shown generally designated as 13. Capture system 11 includes capture module 12, input processor 14, storage medium 18, JPEG 2000 (J2K) compressor 16, output processor 22 and J2K server 20. User system 13 includes J2K proxy server 26, output processor 28, storage medium 32, separate multiple users 24 and separate multiple users 30. Each of these modules is described below.

The capture module 12 may include a single camera, or may include multiple cameras mounted on a single platform or mounted on multiple platforms. The number of cameras may be as few as 1 camera or as many as 100 cameras. The capture module may include cameras having multiple viewing angles to enable different perspectives of the viewing subject or to enable stereo imaging of the subject. Capture module 12 may have an adjustable capturing frequency, for example 1 frame per second (FPS), 30 FPS, or 60 FPS. The resolution of the images may also change at different collection frequencies. For example, low resolution video may be achieved at 30 FPS and high resolution images, which are greater than the video resolution, may be achieved at a lower frame rate of 2 FPS.

Input processor 14 may process the entire data set received from capture module 12 or may process portions of the received data set based on requests from individual users. Whether to process the entire data set or to process a portion of the data set is a tradeoff dependent on the number of users in system 10. With many users, system 10 may operate more efficiently if the entire data set is processed by input processor 14. When there are only a few users, on the other hand, it may be more efficient to process the captured data set based on a user demanding a specific region of interest (ROI).

Input processor 14 may perform several tasks. One task may include correcting sensor errors, due to platform and camera misalignments. The processing may also include registration and stabilization of current frames to previous frames, or registration of current frames to a reference frame. The processing may also include seamed or seamless mosaicing of multiple frame camera systems. If stereo imaging is used, input processor 14 may include parallax control of the camera system. Input processor 14 may also provide coordinate transformation to a specific coordinate system. Such transformation may require ortho-rectification and geographic positioning to a reference point, such as a reference point on a football field. The processor may also provide detection and tracking of moving targets and target identification. Such target detection and tracking may be used to select a particular region and time of interest (RTI) in an image frame.

All processed imagery may be stored in storage medium 18. The stored imagery may include metadata, motion vectors of a target of interest, the region of interest of a target, a target's movement history and a target's registration information.

The JPEG 2000 (J2K) compressor 16 may perform data compression of the individual frames selected by input processor 14. If capture module 12 includes multiple camera systems, then J2K compressor 16 may compress the data from each camera separately. The data from each camera may, alternatively, be placed in a buffer of storage medium 18 and, subsequently, accessed by J2K compressor 16 for data compression. In this manner, desired data may be individually compressed for each selected camera head.

In addition, tiles from individual camera images may be sent to multiple compression systems within J2K compressor 16, where each compression system is devoted to an individual camera. All the individually compressed tiles may then be combined into a complete frame. If the processing includes mosaicing of multiple cameras, then the compression may include compressing the mosaic scene into one file.

Still referring to FIG. 1, J2K server 20 may receive all the JPEG 2000 compressed data and may network with multiple users 24 for viewing the data according to a user's request. Such request may be based on time, region of interest, resolution, frame rates, and frequency bands. The J2K server may interface directly with multiple users 24 by way of a unique internet protocol (IP) address. The J2K server may also interface with the J2K proxy server, generally designated as 26. The J2K server 20 may include a JPEG 2000 interactive protocol (JPIP) and may disseminate data based on RTI requests from multiple users 24, and/or RTI requests from J2K proxy server 26. Such data requests may include viewing of a picture taken by capture module 12. The requested data may also include metadata (information about the particular location and specific time of the picture taken). The requested data may also include a preview image (such as a low resolution, low quality, or low bandwidth image) for the purpose of previewing a specific scene of interest. The server may also automatically send information to multiple users 24 and 30 each time an image is collected with the capture module 12. This data informs the user the type of data available and may include metadata and/or a preview image. The JPIP server may fulfill any or all combinations of such data requests.

The J2K server 20 of the present invention is compatible with the JPEG 2000, part 9-ISO/IEC 15444-9 Specification and may provide imagery from the cameras based on a location identified by a pixel space or a geographical ground space. Such ground space may be based on latitude and longitude coordinates. Such ground space may also be based on a particular ground spot, such as a sports field, a street name, or a house number. The data provided by J2K server 20 may be continuous data that has a starting parameter and a stopping parameter. The users 24 and the J2K proxy server 26 may request data based on current time, past time, or future time. Such requested time may be continuous, providing video at a low frame rate. The user's requested region of interest may be defined based on image quality and/or compression ratio. The requested region of interest may also be defined based on resolution of space and/or time. The requested data from the server may also include metadata.

As shown in FIG. 1, system 10 includes output processor 22 and output processor 28. Each processor may provide the processing required to meet RTI requests from different users. Such processing may include transformation of imagery into still formats, such as JPEG, NITFS, TIFF, etc. Such transformation may also include video formats, such as MPEG, and/or H.264. The data may also be time stamped. The output processors may also provide products from the imagery, such as motion vectors, or moving target indicators, and enhanced imagery by correlation techniques.

The present invention contemplates that J2K proxy server 26 and output processor 28 are part of user system 13. As such, J2K proxy server 26 interfaces directly on a computer network to multiple users 30, where each user has a unique IP address. The multiple RTI requests from the multiple users may either be combined into one RTI request or may be prioritized by the J2K proxy server. The proxy server 26 may also obtain data from J2K server 20 based on RTI requests that may be triggered by the occurrence of an event or by identification of a location. Data may be provided directly by server 26 to each individual user 30, or indirectly to each individual user 30 by way of storage medium 32.

The region and time of interest (RTI) is a request to get data from J2K proxy server 26 and/or a request to get data from J2K server 20. As shown, the RTI request may come from any user of users 24 and 30, and proxy server 26. A user may have a joystick for requesting data based on visual information the user is controlling on a display by way of the joystick. The request from a user may also be automatic and may be provided by way of processing algorithms, such as target tracking software, target identification software, and/or motion vector prediction software. The algorithms may also provide a look forward in time or a look backwards in time. An RTI may also be based on a specific pixel location or a geographic location (latitude and longitude). The RTI may also be based on a referenced location, such as yard line, street name, or house number. The RTI may also be based on time that starts at a specific moment, such as time t+30 (for example). The RTI may also be defined based on characteristics, such as image quality, compression ratio, resolution, time, frame rate, and space resolution.

System 10 may advantageously be applied to persistent surveillance. Capture system 11 of system 10 may be housed in a flying platform to collect data during surveillance flights over a target area. As contemplated by the present invention, capture system 11 may stare at a target for hours, while analysts and tactical users examine the data in real time. A goal of persistent surveillance may be to collect imagery over a large area, at reasonable resolution with good revisit frame rates. As resolution, frame rate and area coverage increase, the bandwidth requirements also increase at a significantly faster rate. Therefore, the present invention compresses the incoming data and provides an interactive, end-to-end solution that intelligently uses storage, adapts to changing bandwidth, and provides sufficient processing capability to enable data access for all users in real time.

By way of example, a persistent surveillance system, such as system 11 may cover as much area as possible with a ground sampled distance (GSD) of 0.75 meters and collect data at 2 frames per second. Tables 1 and 2 show the amount of data that may be collected by capture module 12 (FIG. 1) having a 6-camera system and a 10-camera system, respectively. As shown, the raw data rates covering four kilometers produce about a terabyte of data per hour. With compression, however, the resulting data rates are significantly reduced (approximately 10:1).

TABLE 1

6-Camera System
6 Camera System (~4 Kilometer coverage at 0.75 Meter GSD)
Six 11-MegaPixel Cameras collecting at 2 Frames per second
130.06 Mega Pixels/Second
260.1 Mbytes/Second (data stored)

| Data Rate Per Pixel (Including BWC) | Total Data Rates TeraBytes Per Hour | Total Bytes for 7 Hour mission | Number of Disks (400 GByte Drives) |
|---|---|---|---|
| Raw (16 Bits/Pixel) | 0.936 | 6.55 TBytes | 17 |
| Lossless (~6 Bits/Pixel) | 0.351 | 2.45 TBytes | 7 |
| High Quality (1.5 Bits/Pixel) | 0.008 | 0.6 TBytes | 2 |

TABLE 2

10-Camera System
10 Camera System (~8 Kilometer coverage at 0.75 Meter GSD)
Ten 11-MegaPixel Cameras collecting at 2 Frames per second
433.52 Mega Pixels/Second
216.76 Mbytes/Second (data stored)

| Data Rate Per Pixel (Including BWC) | Total Data Rates TeraBytes Per Hour | Total Bytes for 7 Hour mission | Number of Disks (400 GByte Drives) |
|---|---|---|---|
| Raw (16 Bits/Pixel) | 1.56 | 10.9 TBytes | 27 |
| Lossless (~6 Bits/Pixel) | 0.59 | 4.09 TBytes | 11 |
| High Quality (1.5 Bits/Pixel) | 0.15 | 1.02 TBytes | 3 |

If the frame rate is increased from two frames per second to four frames per second, the data rate required by capture module 12 doubles. If the requirement is increased from 0.75 meter GSD to 0.5 meter GSD, there is an approximate 30% increase in the data rate.

The present invention utilizes a recently developed compression technique based on the JPEG 2000 standard. The JPEG 2000 has been shown to provide superior compression performance (i.e. superior image quality at equivalent bitrates) relative to all other still image compression techniques. Additionally, JPEG 2000 provides a fundamental change in how image compression is used. Traditional compression techniques require a decoder to restore an image to the exact bit rate and resolution chosen at the time of compression. The JPEG 2000 compression technique, on the other hand, progressively layers data within the compressed codestream. Several pointer mechanisms are available in JPEG 2000 that allow a server or a client (user) fast access to the information of interest. An intelligent server or client application program may navigate through the compressed codestream to find exactly the data requested. A single JPEG 2000 encoded file may be decoded at any resolution, at any quality, and at any region of interest (ROI).

The JPEG 2000 compression technique uses algorithms based on discrete wavelet transform (DWT). The DWT algorithm typically decorrelates the input data in order to remove redundant information prior to quantization and entropy encoding. The DWT based algorithms operate on the whole image at once and take advantage of correlation that exists over an entire image. The DWT is hierarchical in nature and produces renditions of the original image at full resolution, ½ resolution, ¼ resolution, 1/16 resolution, etc. Thus, the DWT tries to isolate global scale changes from local correlations. For most images, the energy compaction (i.e. a reduced number of "significant" transform coefficients) achieved with the DWT is greater than the energy compaction achieved by algorithms based on DCT or DPCM transform. It has been shown that algorithms based on wavelet transform produce fewer visually objectionable artifacts than algorithms based on DCT or DPCM transform, especially when compressing low bit rates to achieve high compression ratios or when compressing large images.

Another advantage of JPEG 2000 is embedded coding, in which different quality levels are contained within a single compressed bit stream. This is enabled by the concept of bit-plane coding of transform coefficients (i.e. embedded quantization). Embedded coding allows different bit rates, or qualities, up to the original bit rate to be extracted from a compressed file. Embedded coding enables the decoder to choose the data to extract from the compressed file. The decoder may choose a user desired resolution and a user desired image quality from the compressed file. Thus, a compressed file may have an image compressed to 3.0 bits/pixel using JPEG 2000 and a user may subsequently request a ¼ resolution version of the image at 1.0 bits/pixel quality by simply reading a subset of the full 3.0 bits/pixel compressed file.

Under the JPEG 2000 paradigm, data is progressively layered within the compressed codestream. Several pointer mechanisms are available that allow a server or a client fast access to a region of interest. An intelligent client or server application may quickly navigate through the compressed codestream to find exactly the desired data. The JPEG 2000 standard also provides the JPIP protocol, which allows a server to stream data to a client application over different communication links or computer networks.

Thus, capture system 11 (FIG. 1) may have to compress an image only once at the bit rate required to obtain the highest desired quality for archive. When sending compressed imagery to a variety of data users with different bandwidth requirements, the single high quality compressed file may be parsed to the desired bit rate and sent to the appropriate user. This compression paradigm reduces the number of operations that a data provider has to perform by producing a progressively encoded bit stream. In addition, region of interest (ROI) coding allows preservation of a high quality region in an image, while compressing the surrounding background to a lower quality. This allows for very accurate reconstruction of a region in the image that is important, while still maintaining a low overall bit rate for the background information that is deemed to be less important.

Figure 2:
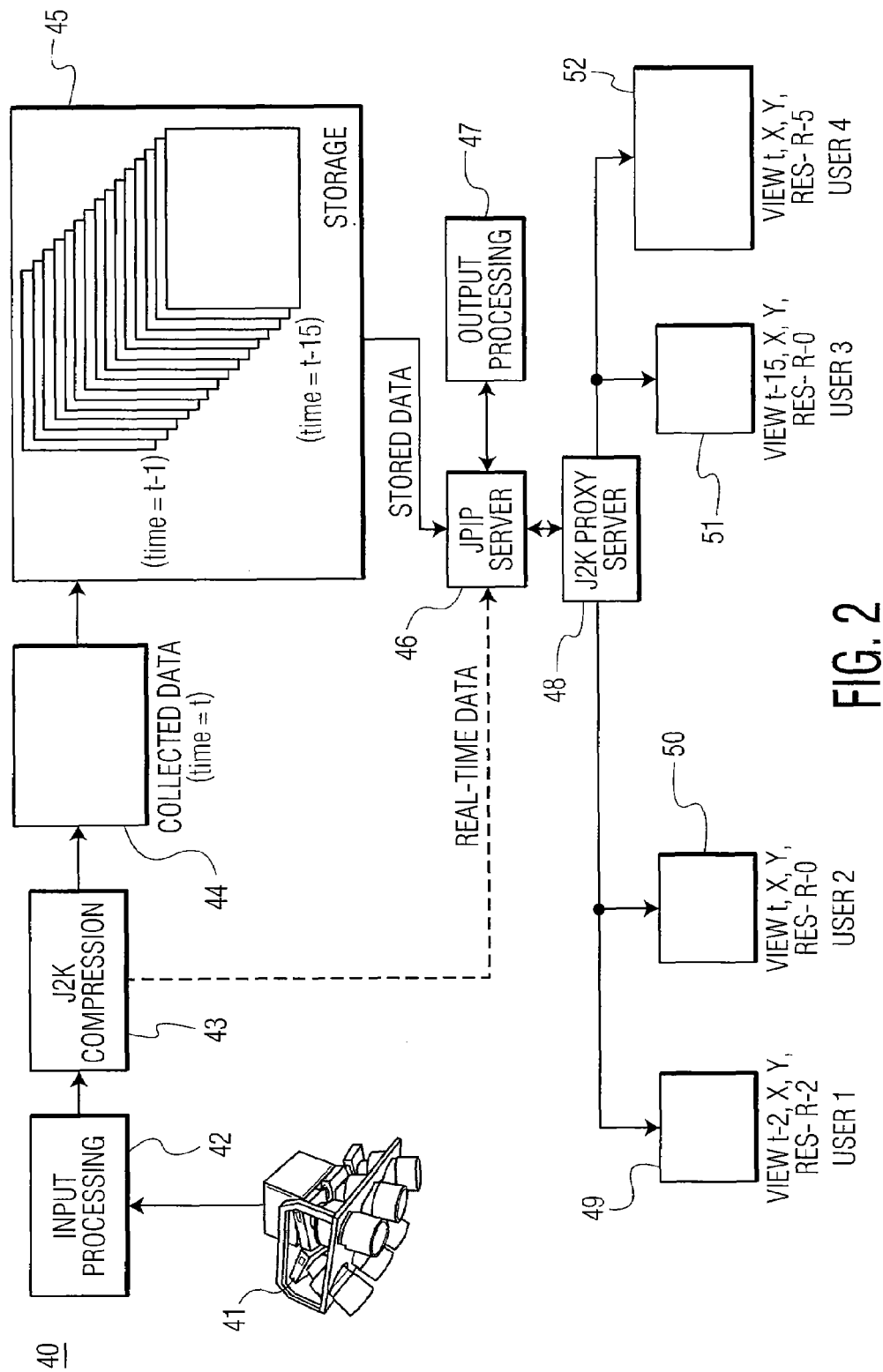
FIG. 2 depicts another system for capturing image data, in which a JPIP server collects image data from a capture device, and a proxy server extracts stored image data and/or real-time image data from the JPIP server to fulfill RTI requests from multiple users, in accordance with another embodiment of the present invention.

Referring next to FIG. 2, there is shown a collection and dissemination system, generally designated as 40. As shown, capture module 41 includes a set of cameras disposed on a single platform. The processor 42 receives the images obtained by capture module 41 and provides the images to JPEG 2000 compressor 43. The compressed data formed by the JPEG 2000 compressor is provided to storage medium 45 as a series of sequentially compressed frames 44. Each compressed frame 44 is stored in storage medium 45. Each compressed frame is time tagged, by way of example, from time t-15 to a more current time of t-1. The JPIP server 46 provides an interface between collected real time frames from J2K compressor 43 and stored frames from storage medium 45 at one end and J2K proxy server 48 at the other end. With the aid of output processor 47, JPIP server 46 communicates with the J2K proxy server. The J2K proxy server, in turn, communicates on a network, such as the Internet, with individual users 49, 50, 51 and 52.

As shown in FIG. 2, user 1 (49) requests a view of a frame taken at time t-2 at a region of interest X,Y and at a resolution of R2. User 2 (50) requests information from J2K proxy server 48 to view a frame taken at time t at a region of interest X,Y and at a resolution of R1. Similarly, user 3 (51) requests frame data taken at t-15 of a region of interest X,Y at a resolution of R1. Furthermore, user 4 (52) requests a view of frame t at region of interest X,Y at a resolution of R5. The proxy server may also combine the RTI requests from user 2 (50) and user 4 (52) into a single RTI request because of overlapping data requests.

In accordance with an embodiment of the present invention, the proxy server interfaces with the JPIP server and obtains different sets of data. Such sets of data may be data arriving from storage medium 45 or data arriving directly from compressor 43. The JPIP server provides data based on a client/server relationship defined by part 9 of the JPEG 2000 standard (JPIP). This interactive protocol is able to select data within a frame. For example, the interactive protocol may request tiles, quality layers, and/or regions of interest within a frame. In addition, the interactive protocol allows a user to request data based on a location (X,Y), a target of interest (identification of a target), or occurrence of an event (such as a door opening). As an example, a request from user 1 may be a view of a region of interest (X,Y) based on a latitude/longitude location or a specific position on a field. Proxy server 48 may then translate that user request into a camera movement to obtain a new image location within a frame based on that camera movement. As another example, user 2 may select a target for viewing, such as a person or a moving vehicle. Proxy server 48 may then translate that request into a request for a region of interest box that includes the target of interest. Still another example, user 3 may request a low resolution of an image for an entire time until a certain event occurs. Such an occurrence of an event may be based on opening of a door, flashing of a light, or producing a loud noise. Upon the occurrence of such an event, user 3 then requires a high resolution image. Proxy server 48 may translate that request to JPIP server 46 to provide real time data directly from compressor 43 of the entire image at a low resolution until the occurrence of the specific event. Upon the occurrence of that specific event, the real time, low resolution data may be switched to stored data at a high resolution.

Figure 3:
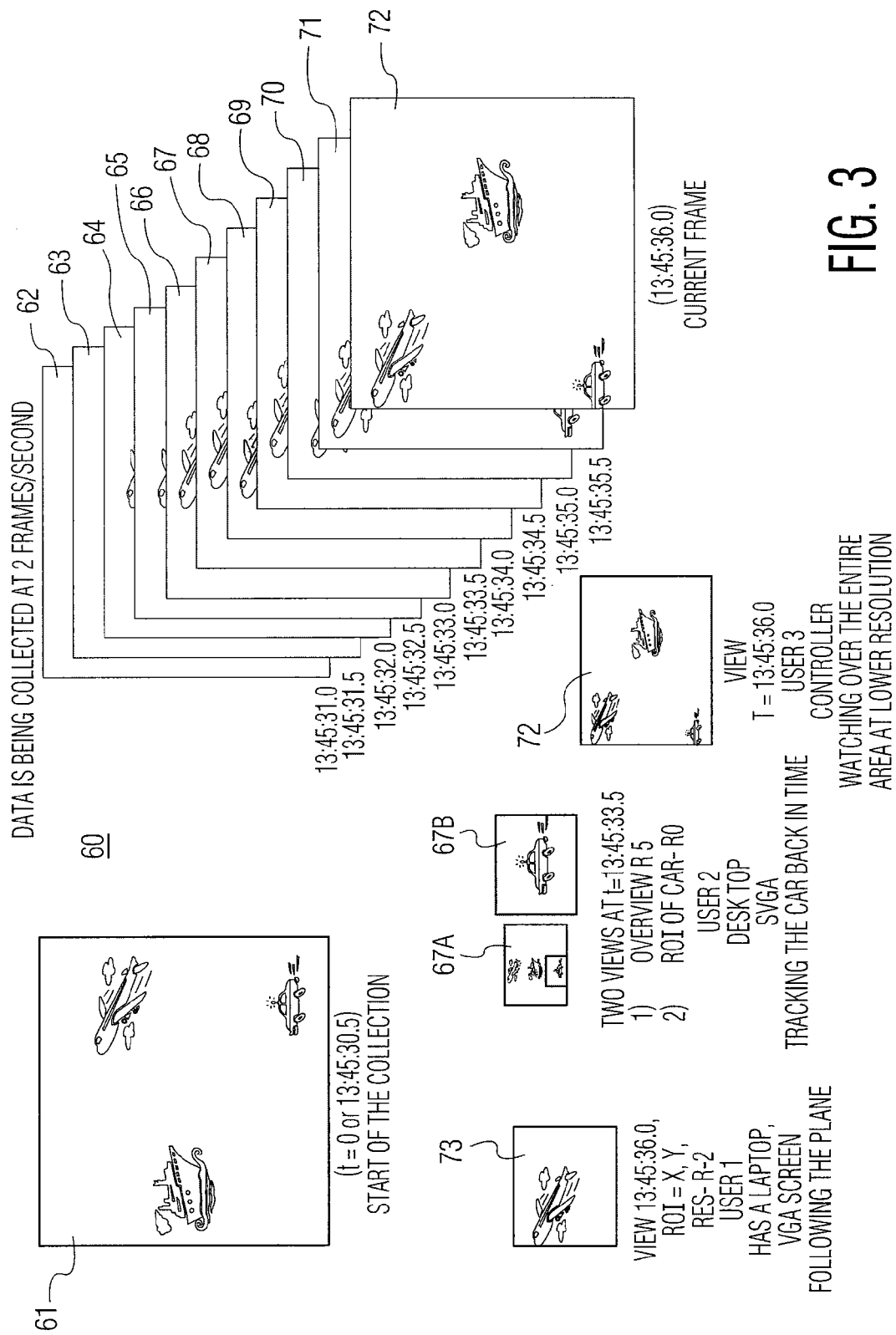
FIG. 3 is a sequential view of image data collected at two frames per second, where different portions of the collected image are requested by three different users, in accordance with an embodiment of the present invention.

Referring to FIG. 3, there is shown a collection of images or frames, generally designated as 60. The images or frames shown may be part of a sequence of frames occurring in real time and outputted from compressor 43 (FIG. 2), or they may be a set of images or frames stored in storage medium 45 (FIG. 2). Accordingly, frames 61 through 72 are frames collected at two FPS. At time t=0, frame 61 marks the beginning of the frame collection. The remaining set of sequential frames, taken every ½ second, is shown as frame 62 up to the current frame 72.

As an example, user 3 may be a traffic controller watching over an entire imaging area at a low resolution. User 3 is shown viewing incoming frames at a low resolution and is presently viewing frame 72. User 1, on the other hand, may be a laptop user with a VGA screen who is interested in following the aircraft shown in frame 72. Accordingly, user 1 is shown viewing the aircraft appearing in the region of interest X,Y at a resolution of R2. Different still, user 2 may be a desktop user with an SVGA monitor who is interested in tracking a car backwards in time. Accordingly, user 2 is shown viewing two views at the specific time shown. The first view is frame 67A, which includes the overview of the entire image at a resolution of R5, and the second view is frame 67B, which includes the car at a region of interest X,Y with a resolution of R0.

Figure 4:
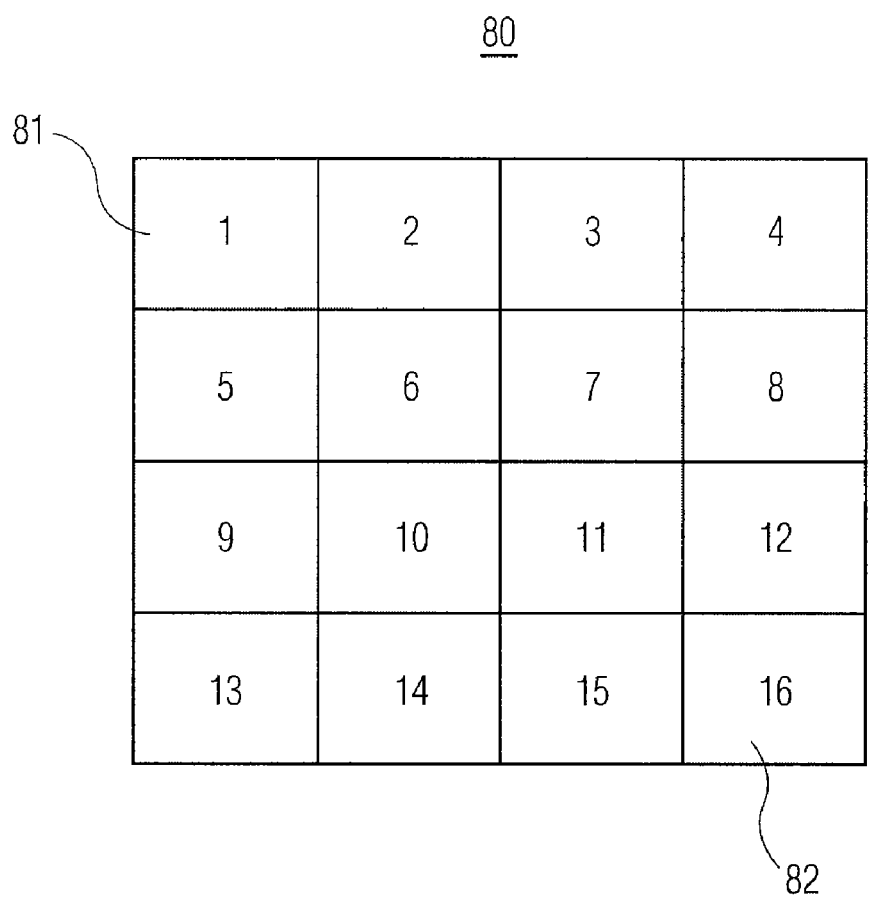
FIG. 4 is an example of an image partitioned into 16 different regions or tiles.

Referring next to FIG. 4, there is shown a frame, generally designated as 80, partitioned into 16 regions of interest or tiles. For example, tile 1 and tile 16 are shown designated as 81 and 82, respectively. It will be appreciated that a frame in the JPEG 2000 protocol may be partitioned into more or less than 16 regions of interest (or tiles). For example, there may be 32 or 64 tiles in a frame. For the purpose of explanation, whole and contiguous tiles are used in the figures. It will be understood, however, that the RTI requests may be regions of interest of any size, location, and shape as defined by the user. Furthermore, RTI requests may be smaller than a tile of an image and may cross multiple tile boundaries.

Figure 5A:
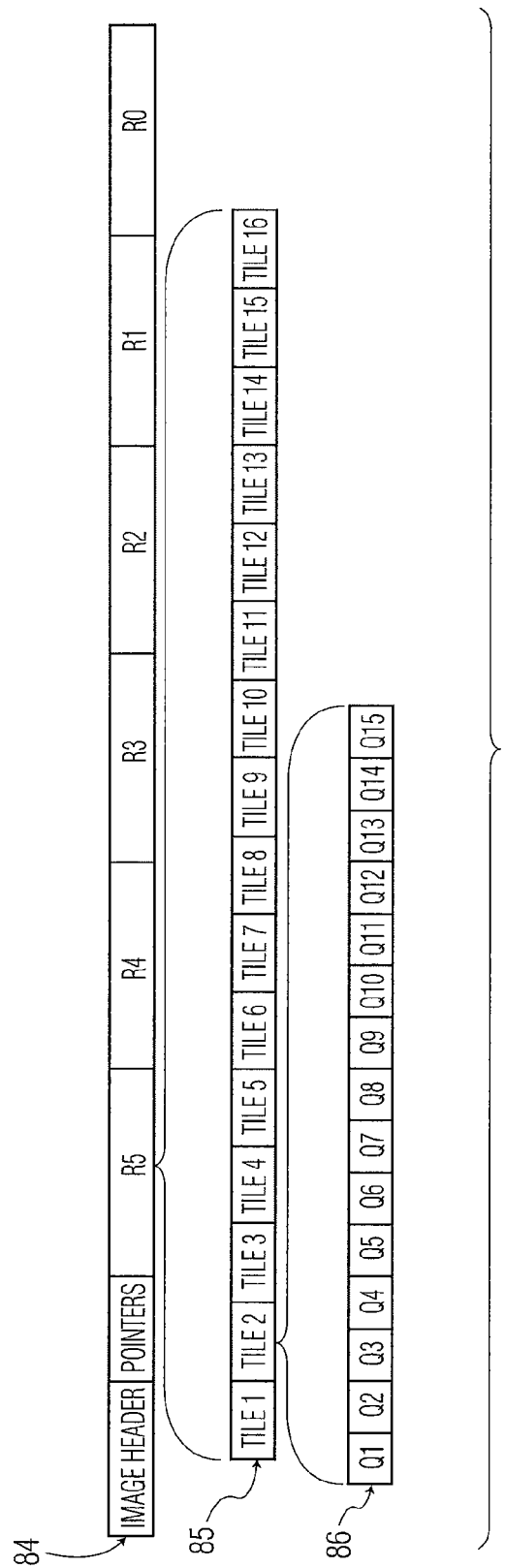
FIG. 5A depicts JPEG 2000 compressed data stored in a file that includes multiple tiles captured at a hierarchical order of resolution, and a hierarchical order of quality.
Figure 5B:
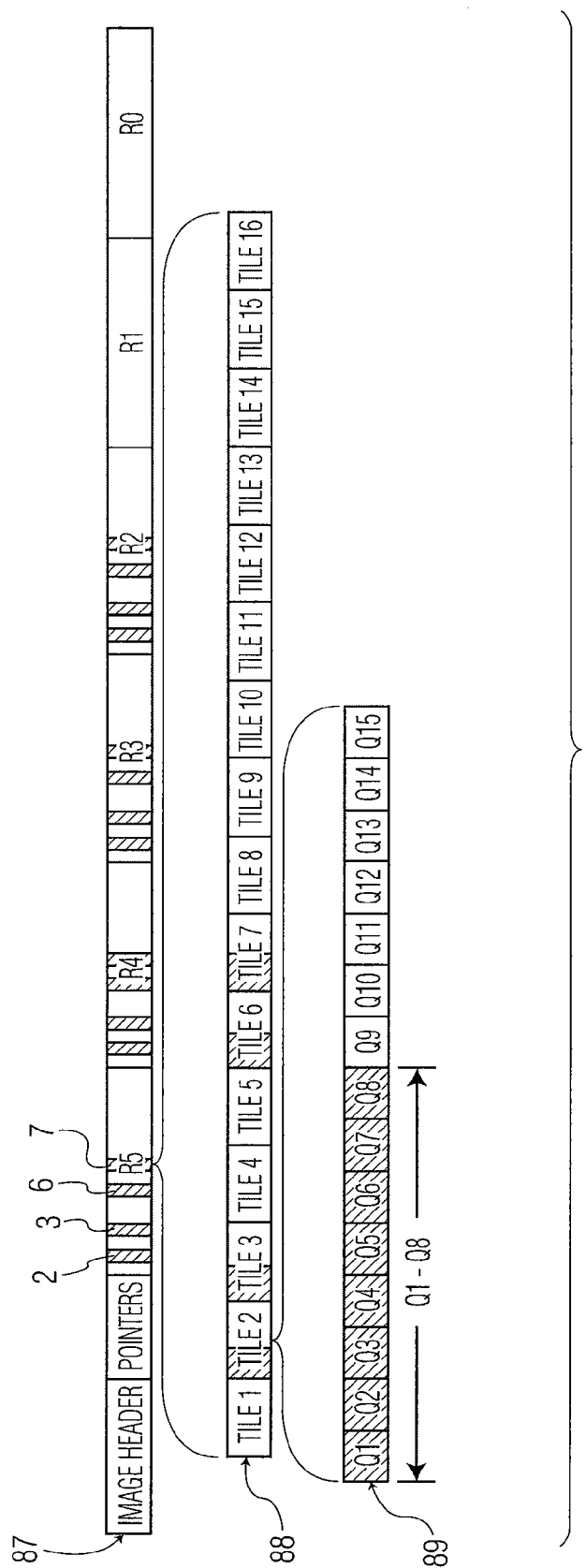
FIG. 5B depicts another image file sent to a user who requested regions at tiles 2, 3, 6 and 7 at a resolution of R2 and a quality level of Q8.

The manner in which data is collected and disseminated within the JPEG 2000 protocol is shown in FIGS. 5A and 5B. The JPEG 2000 protocol compresses data in a hierarchical order selected by the user. The user may select any order of the following parameters: regions of interest (or tiles), resolutions and image qualities. For example, data stream 84 is an image frame with 6 different levels of resolution, namely resolutions R5 to R0. It will be understood that R0 is the highest resolution and each resolution number below R0 is a two times reduction in resolution. As shown, resolution R5 data includes 16 tiles of a frame (for example frame 80 of FIG. 4). The set of tiles 85 are 16 different regions of interest in a frame taken at a resolution of R5. Furthermore, each tile (for example tile 2) includes 15 different quality layers, designated as 86.

For a user requesting tiles 2, 3, 6 and 7 (located as shown in FIG. 4) at medium quality (for example Q8) and resolution of R2, the system extracts the shaded portions shown in FIG. 5B. As shown, data is extracted at tiles 2, 3, 6 and 7 (tile set 88) for each of resolutions R5 to R2 (data frame 87). In turn, each tile 2, 3, 6 and 7 of tile set 88 has quality layers Q1-Q8 extracted, as shown by quality layer set 89.

Figure 6:
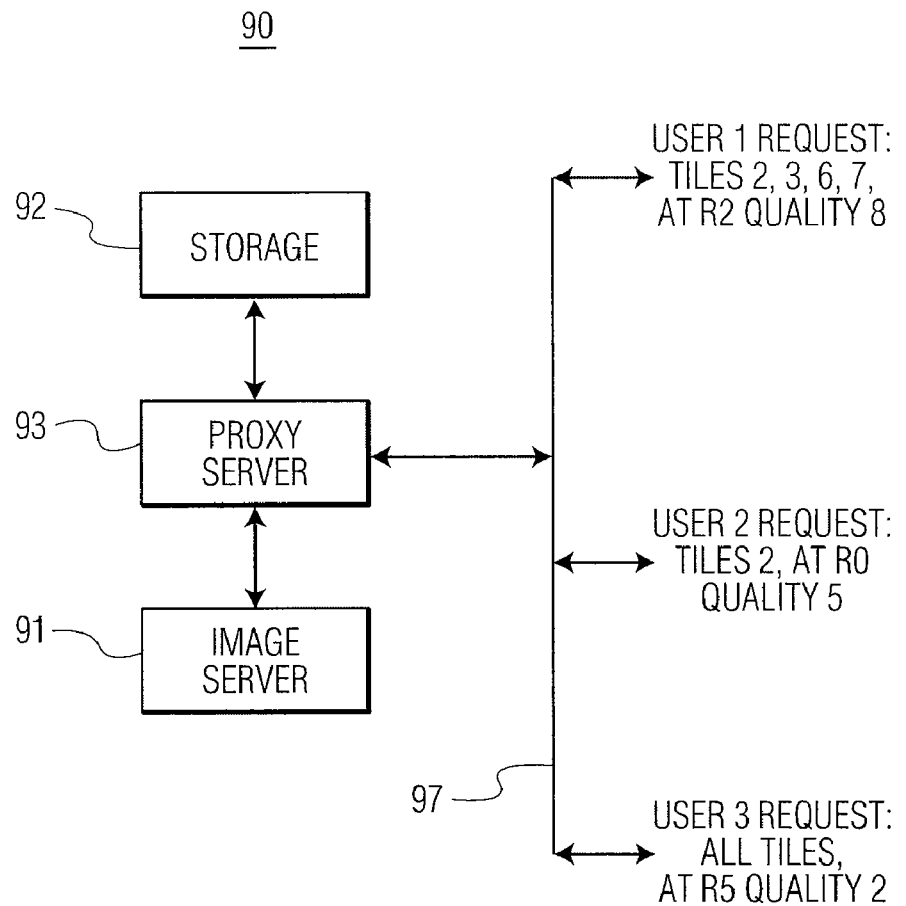
FIG. 6 is a high level block diagram of a proxy server fulfill RTI requests coming from 3 different users (users 1, 2 and 3)

In another example, as shown in FIG. 6, proxy server 93 interfaces with common server (JPIP server) 91 and fulfills the requests of three users. Proxy server 93 provides data to each user through computer network 97. Depending on the type of request from each user, proxy server 93 may transmit stored data to the end user obtained from storage medium 92 and/or transmit real time data to the end user obtained from common server 91. As shown, user 1 requests to see tiles 2, 3, 6 and 7 at R2 and at quality Q8. This requires extraction of data from frame 94, as shown by shaded lines in FIG. 7A. Since user 1 requests data at resolution R2, all data taken at resolution R5 to R2 are extracted at tiles 2, 3, 6 and 7. Since quality Q8 is requested, data is extracted at 8 layers from Q1 to Q8.

User 2 requests data at a position of tile 2, at resolution R1 and at quality Q5. FIG. 7B shows the data that proxy server 93 extracts from data frame 95. Since only tile 2 is requested, at resolution R1, proxy server 93 extracts the tile 2 data at resolutions R5 to R1. Since quality Q5 data is requested, proxy server 93 extracts quality layers Q1-Q5 of each tile 2 in every resolution from R5 to R1.

User 3 requests all tiles from proxy server 93 at a resolution of R5 and at a quality Q2. Consequently, proxy server 93 extracts data from all 16 tiles at only resolution R5 from frame 96, as shown in FIG. 7C. Since quality Q2 data is requested, proxy server 93 extracts Q1-Q2 quality layers as shown.

Figure 7A:
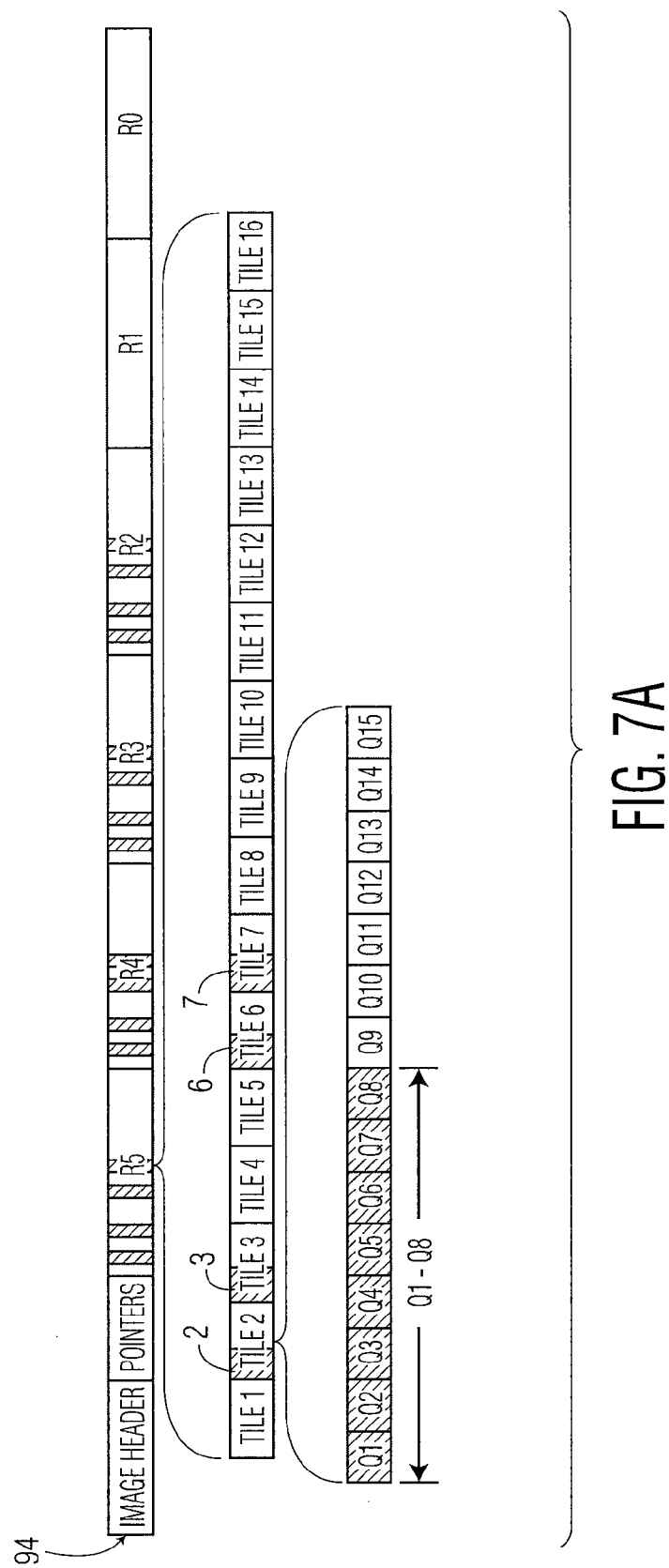
FIG. 7A depicts a file of compressed image data sent to fulfill the RTI request of user 1 shown in FIG. 6.
Figure 7B:
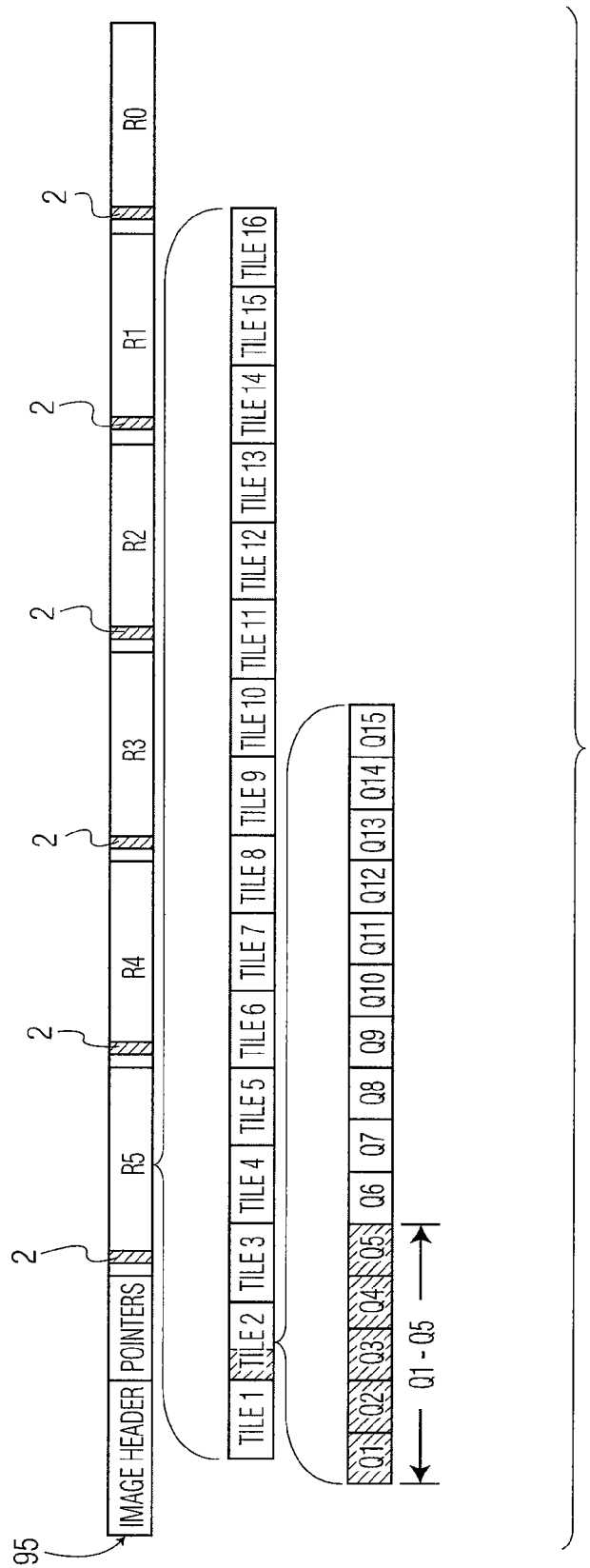
FIG. 7B depicts a file of compressed image data sent to fulfill the RTI request of user 2 shown in FIG. 6.
Figure 7C:
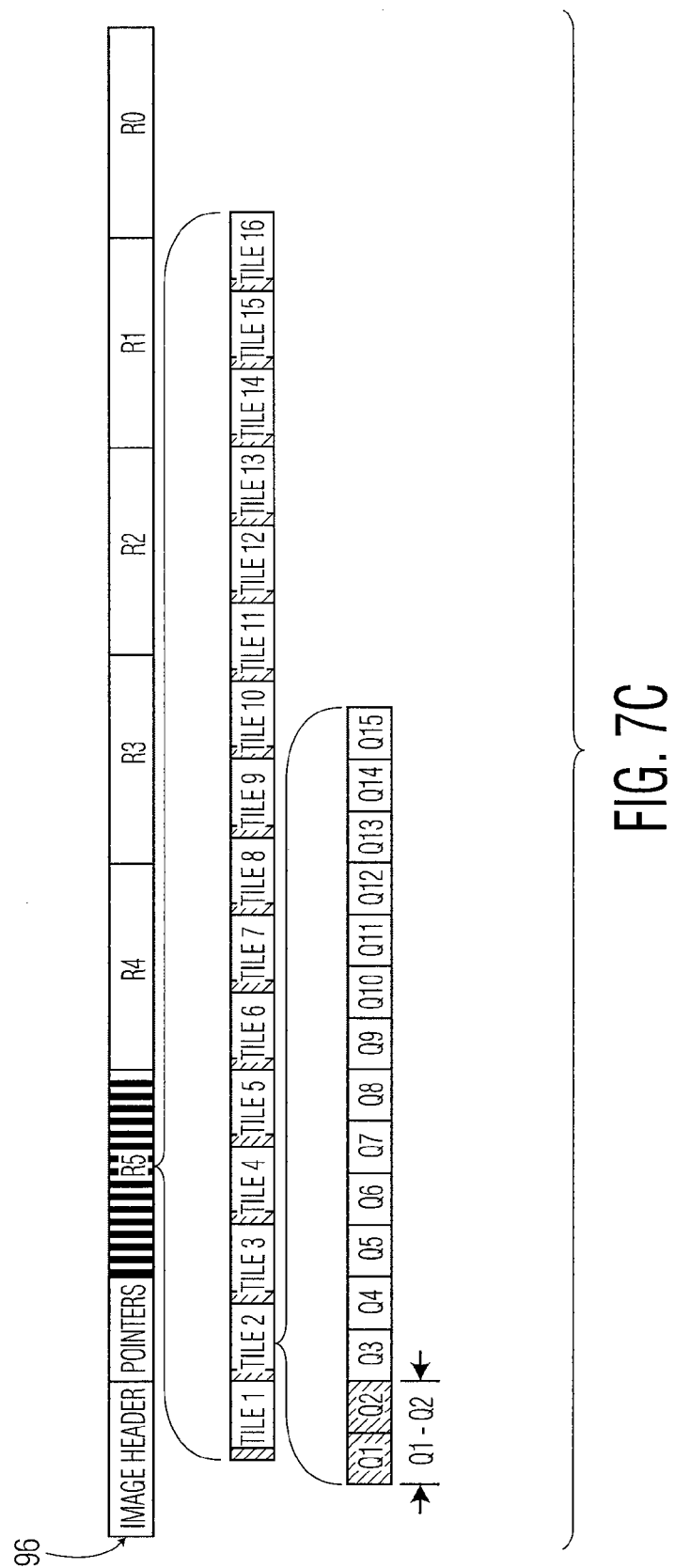
FIG. 7C depicts a file of compressed image data sent to fulfill the RTI request of user 3 shown in FIG. 6.

As may be seen from FIGS. 7A-7C, data requested by each user has overlap regions with data requested from the other users. If proxy server 93 does not provide the interface between common server 91 and each end user, there is a significant waste of bandwidth from the collection system down to the end users. In other words, the downlink bandwidth is wasted. However, because proxy server 93 is disposed by the present invention between the end users and the common server, proxy server 93 only needs to make one request from common server 91. By only making one request, redundant requests from the end users are eliminated. Proxy server 93 receives the response from common server 91 and parses out data as needed by each user. The headers and wrappers of the data are placed around each of the data streams to meet the users' requests. Proxy server 93 also stores the received data in storage medium 92. Consequently, if a new user requests data that has already been down-linked to another user, proxy server 93 may request only new data from the collection system by way of common server 91 which are required to fulfill the new users request. The proxy server may then combine the new data with previous data stored in storage medium 92. After combining the data from common server 91 and the data stored in storage medium 92, the combined data is transmitted to the new user by way of network 97. Such combination of data allows the bandwidth of the downlink to be reduced and the load to be at a minimum between the end user and the capture system.

Proxy server 93 may also prioritize the sequence of downloading data to each user based on user rankings. For example, if one user is more important than another user, then 100% of the bandwidth may be allocated to the first user until his needs are fulfilled. As another example, an important user may be given 70% of the bandwidth and the remaining users may be given 30% of the bandwidth. If the first user does not have any data needs, then the other users may receive a 100% of the bandwidth.

As another embodiment, proxy server 93 may also make decisions on the quality and the resolution requested from each user. These decisions on quality and resolution may be dependent on limitations of the bandwidth. For example, if five users simultaneously request different tiles at quality Q10, but the available bandwidth is not sufficient to supply all the requests, proxy server 93 may then decide to reduce the quality sent to each user and transmit all the tiles at quality Q8 (for example). As another alternative, one prioritized user may receive data at quality Q10 but another user may get quality at Q7. Thus, proxy server 93 may adjust the request of the users, based on availability of bandwidth and the number of users requesting simultaneous non-overlapping data.

Figure 8A:
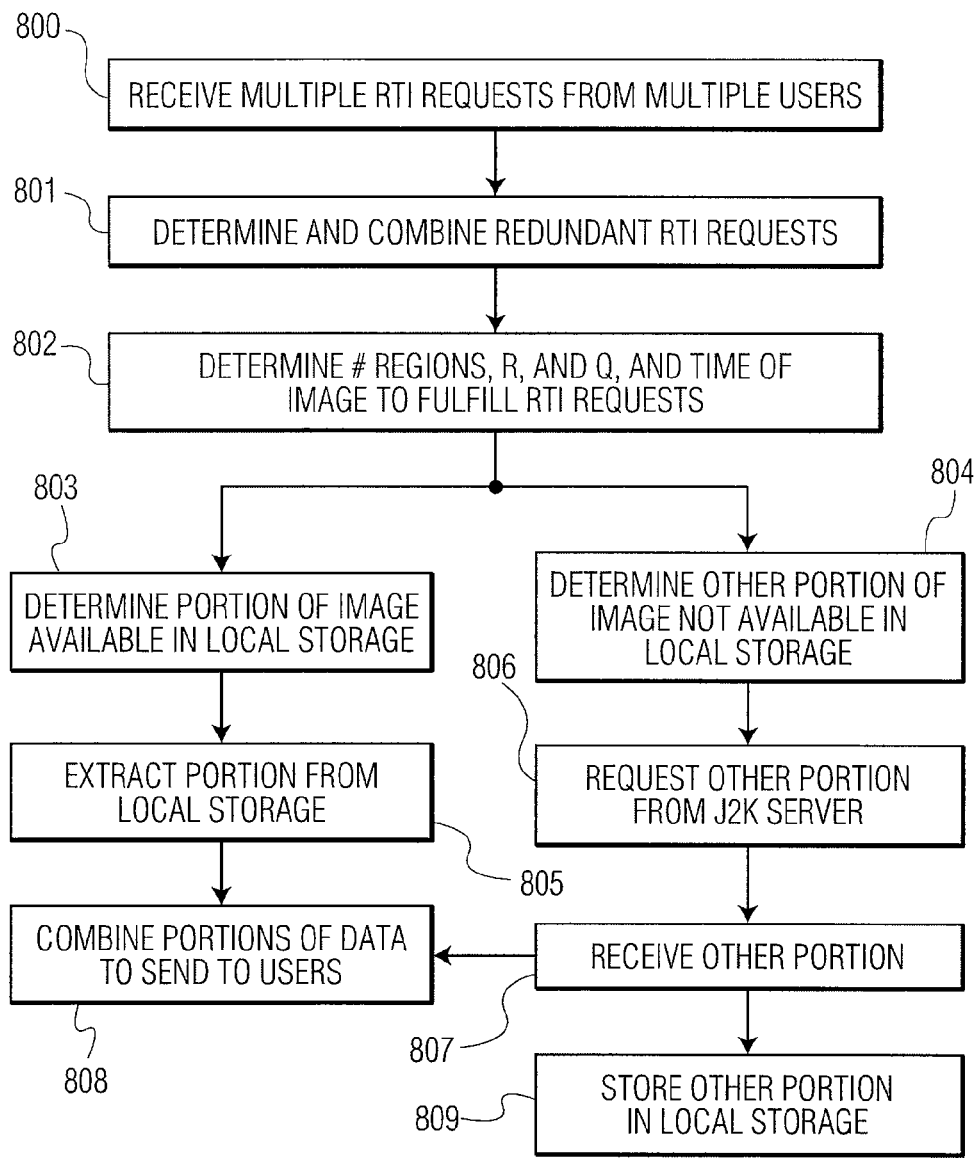
FIG. 8A is a method of fulfilling RTI requests of multiple users, in accordance with an embodiment of the present invention.

Referring now to FIG. 8A, the operation of the J2K proxy server will now be explained by reference to method 820. As shown, the proxy server in step 800 receives at least one RTI request from a user. As shown, the proxy server receives multiple requests from multiple users. As described previously, each RTI request may be a request of a region of an image (for example, user 1 requests a region of interest adjacent to tiles 2, 3, 6 and 7) at resolution 2 and quality level 8. The request may also include a requested time from t=0 to t=t1 (for example). Such request may also include a geographic location of a target of interest, or a request to follow the motion of a target from one region to another region in a sequence of images.

Figure 8B:
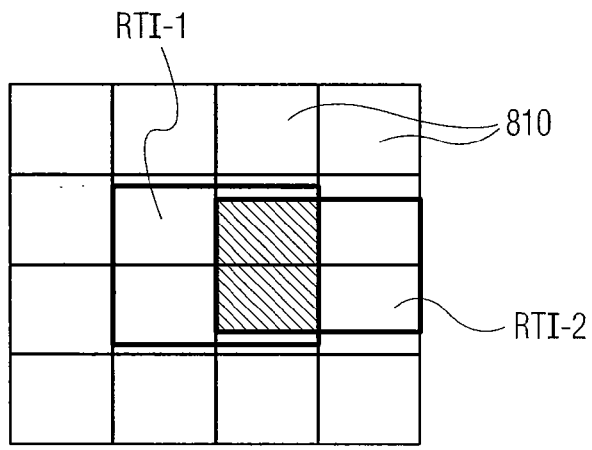
FIG. 8B is an example of two RTI requests from two respective users that request redundant or overlapping regions of interest of an image partitioned into 16 different regions.
Figure 8C:
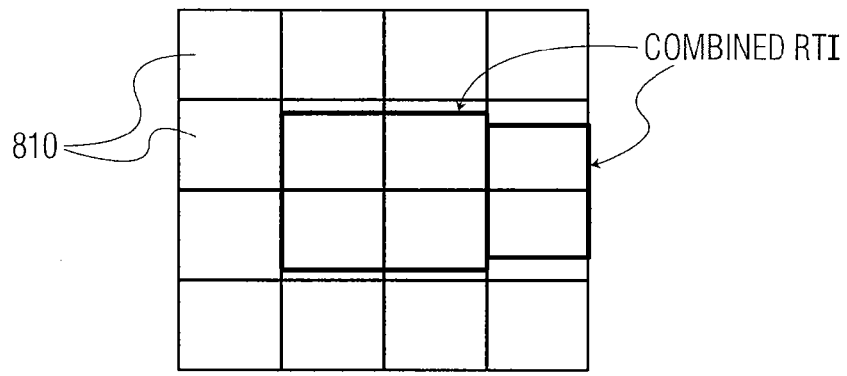
FIGS. 8C and 8D are, respectively, different combined RTI requests formatted by the proxy server of FIG. 1 in order to eliminate redundant or overlapping data in the two different RTIs shown in FIG. 8B, in accordance with an embodiment of the present invention.
Figure 8D:
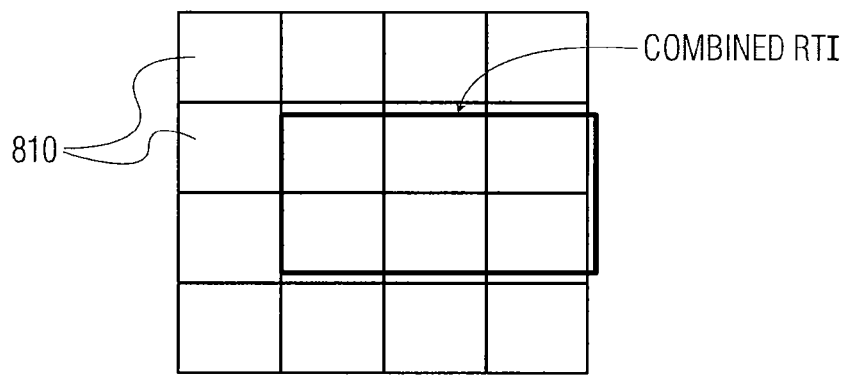

The proxy server, using step 801, examines the regions of interest from the multiple users and combines the RTI requests so that any overlap from one RTI to another RTI is eliminated. This is shown as an example in FIGS. 8B, 8C and 8D, and assumes an image having 16 tiles, each designated by 810. In FIG. 8B, user 1 requests a region of interest shown as RTI-1 and user 2 requests another region of interest shown as RTI-2. There exists an overlap between RTI-1 and RTI-2 shown by the shaded portion that is approximately within two tiles of the image. The proxy server combines the two overlapping RTIs into a combined RTI, which eliminates the redundant portion of the image. By way of example, in FIG. 8C, the proxy server has formed a combined RTI that is slightly different from the combined RTI formed in FIG. 8D. Thus, according to one aspect of the invention, the proxy server has advantageously eliminated redundant requests sent to the J2K server (FIG. 1). This reduces the required bandwidth of system 10 (FIG. 1).

The proxy server, using step 802, determines the number of regions at the level of resolution R and quality level Q required for each image frame in order to fulfill the combined RTI request. If the received individual RTI requests from the users include parameters of regions, resolution level R and quality level Q, the proxy server only needs to modify the regions (to eliminate redundant or overlapping regions) in the combined RTI request. On the other hand, if the received individual RTI requests are in the form of geographic locations of a target (for example), then the proxy server may have to convert the geographic locations of the target to correspond to the regions of interest of an image. Similarly, if the RTI request from a user includes a request to follow a target of interest, the proxy server may have to determine the respective regions in a sequence of frames that correspond to the target motion. For each of such regions in a frame, the proxy server may also have to identify the resolution level and the quality level.

Having determined the regions, at a resolution and a quality level per frame of an image, the proxy server, in step 803, determines the portion of the frame that is already available in local storage. The available portion of the frame is then extracted from local storage in step 805. The remaining portions of the image that are not available in local storage is determined in step 804. The proxy server, using step 806, requests this remaining portion from another server, such as the J2K server shown in FIG. 1. The J2K server may command the capture device to image a scene corresponding to the regions of interest at a requested resolution and quality level. After obtaining the requested data, the J2K server sends the data to the proxy server, as shown in step 807. This newly received data is then stored in a local storage medium in step 809. Concurrently, the proxy server combines portions obtained from the local storage and the real-time data portions received from the J2K server. The combined data is send as a new file to each respective user, in step 808.

Figure 10:
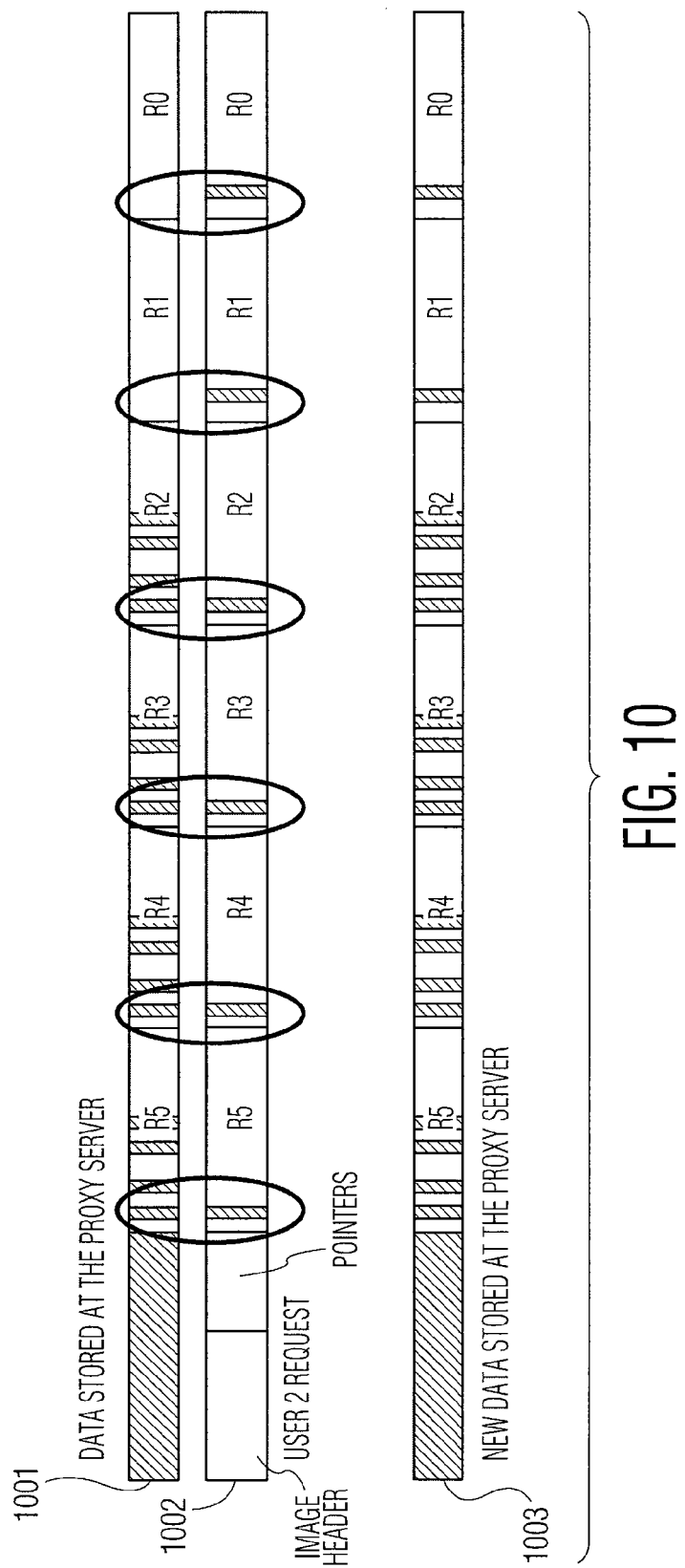
FIGS. 10, 11, 12 and 13 depict exemplary files of compressed image data sent to different users when using the method shown in FIG. 8.

By way of example, recall that user 1 in FIG. 7A has requested an image that includes tiles 2, 3, 6 and 7 at resolution 2 and quality level 8. Because of such request, the proxy server has previously stored image file 1001 shown in FIG. 10. User 2 is now requesting an image of tile 2 at resolution 0 and quality level 5. Upon receiving the request from user 2, the proxy server checks its own local storage medium for the data. A fulfilled user 2 request is shown as image file 1002. The common data between the user 1 request and data previously stored in the storage medium is shown circled in FIG. 10. To obtain the missing data, the proxy server needs to request from image server 91 (FIG. 6) only tile 2 at resolutions R1 and R0. The proxy server then combines the data to fulfill the RTI request of user 2. The new data file stored at the proxy server is image file 1003.

Figure 11:
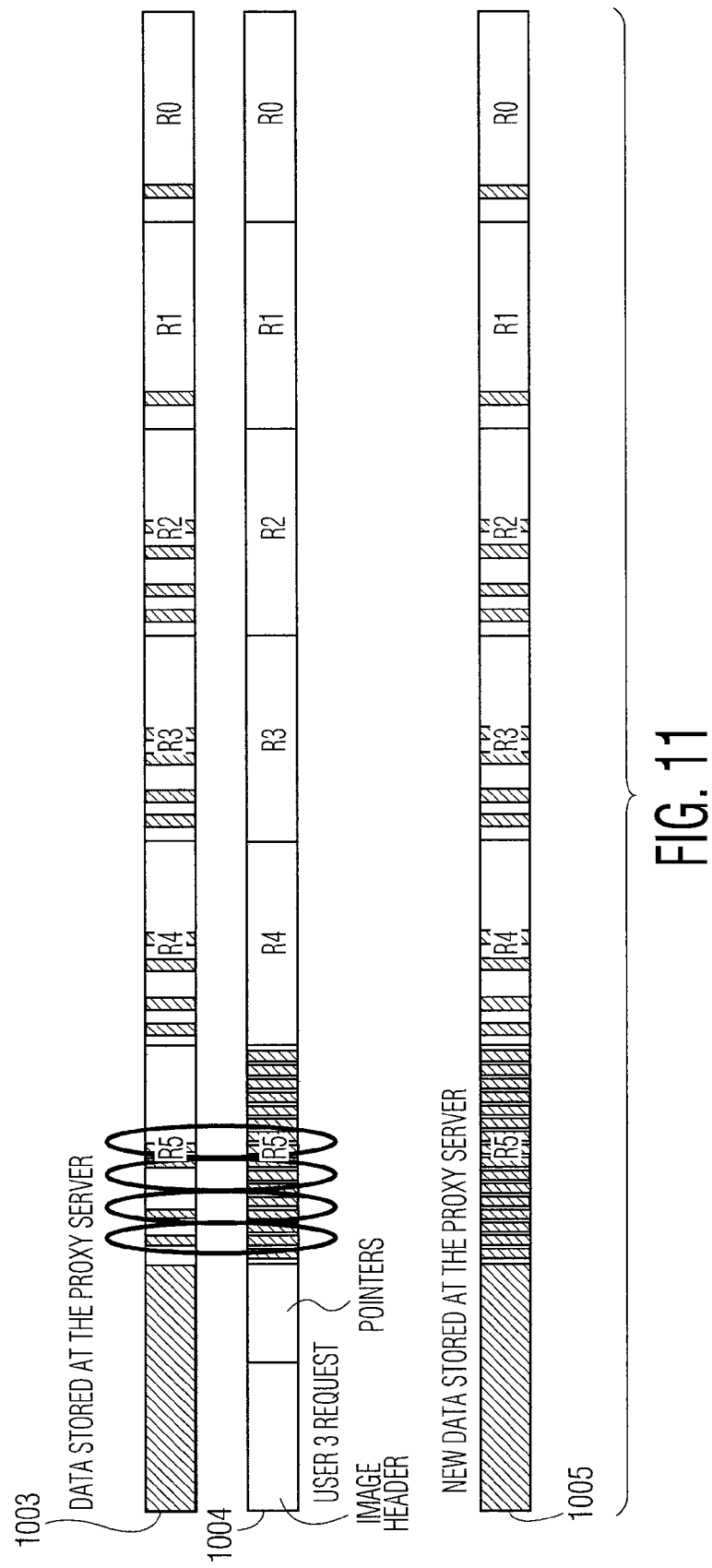

Continuing the above example, user 3 requests an image having all the tiles at resolution 5 and quality level 2. The proxy server checks its own local storage for that data. The common sections between the user 3 request and the data previously stored at the proxy server are designated as file 1004 and file 1003, respectively, in FIG. 11, and are circled as shown. The proxy server has tiles 2, 3, 6 and 7 at resolution 2 and quality level 8. Consequently, the new data requested by the proxy server are tiles 1, 4, 5 and 8-16 at resolution 5 and quality level 2. The proxy server after obtaining the new data, combines the new data with the appropriate data in local storage. The proxy server repackages this combined data into new file 1005 with an updated header. The repackaged file is transmitted as one file to user 2. The user 2 may then decode the received file and display the file as an image frame.

Figure 12:
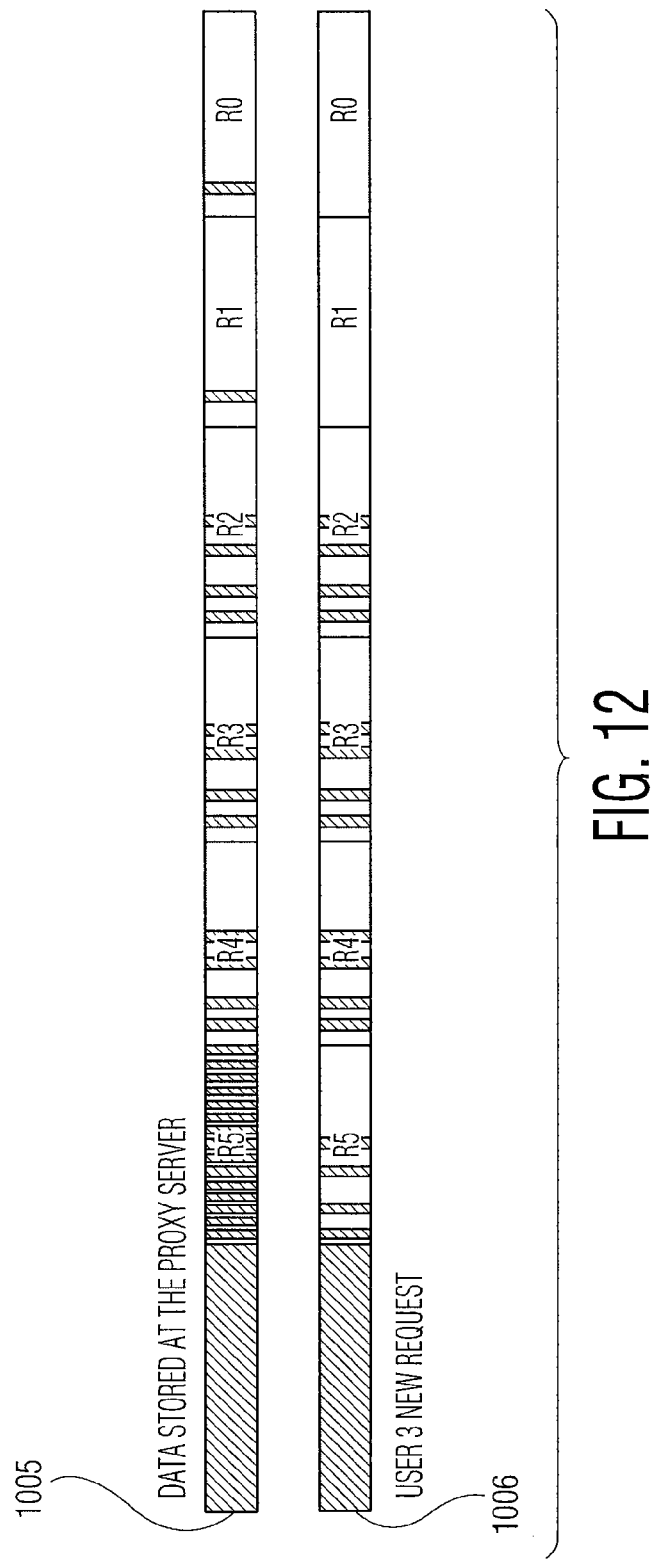

Continuing the above example, user 3 desires to zoom into an object. User 3 requests a frame that includes the object at a specific region (tiles 2, 3, 6 and 7, for example) at resolution 2 and quality level 8. The proxy server checks its storage for that data and determines that all the data is available in storage. Portions of the data stored at the proxy server, designated as file 1005 in FIG. 12, is repackaged into a new file with an updated header. This new updated file is designated 1006 in FIG. 12. No additional data has to be requested from the image server. This advantageously saves bandwidth in the system.

Figure 13:
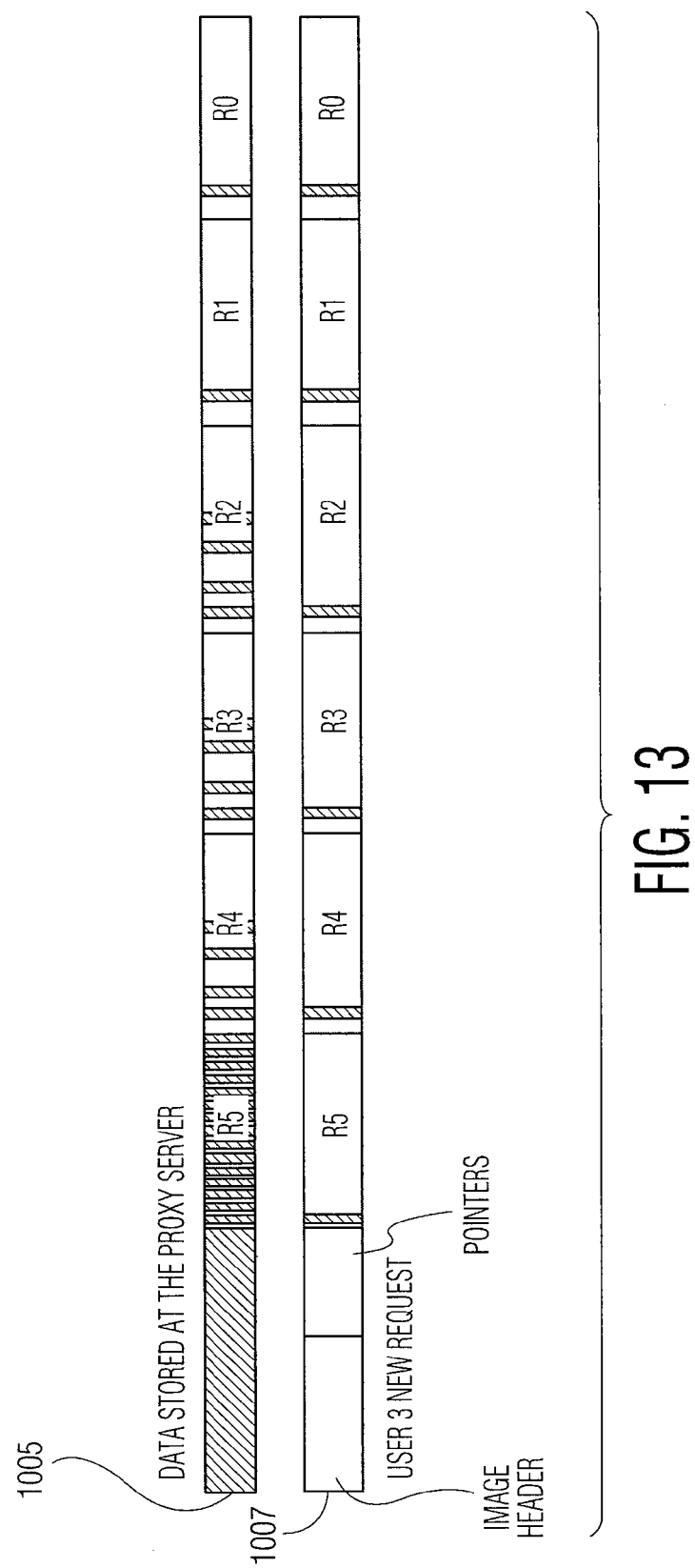

Still continuing the above example, user 3 requests tile 2 at resolution 0 and quality level 5. The proxy server checks its storage for that data and determines that it has all the data. As shown in FIG. 13, the proxy server repackages data extracted from file 1005 in storage to form new file 1007. This new file is transmitted to user 3.

It will be appreciated that without the proxy server disposed between the end users and the image server (for example, server 20 in FIG. 1), each user must request the data individually from the image server (for example, server 20). In such condition, the image server responds within the limits of the bandwidth in the system (for example, system 10). Since server 20 must respond individually to each user and must provide the entire data requested by each user, a large bandwidth is required to fulfill the many requests of the multiple users. However, with proxy server 26 (for example) extracting data from its own local storage 32 (for example), combining redundant or overlapping RTI requests into one RTI request, and requesting only missing data from server 20 (for example), the bandwidth required to respond to the multiple users is greatly reduced.

Figure 9:
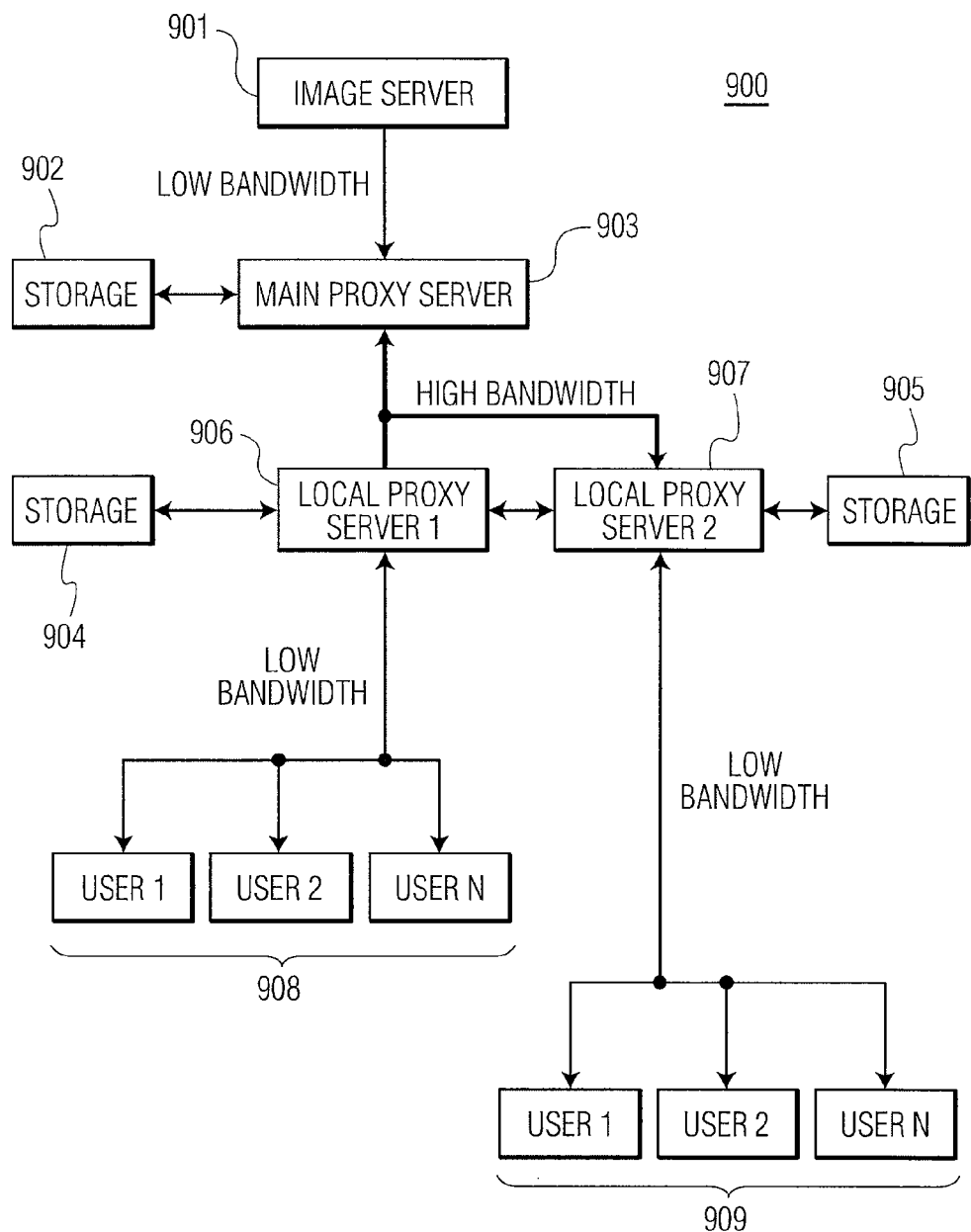
FIG. 9 is a block diagram of a system including multiple local proxy servers communicating between a main proxy server and multiple end users, in accordance with another embodiment of the present invention.

The proxy servers of the present invention may be chained or combined to service multiple users with limited bandwidths. Such an embodiment is shown in FIG. 9 as system 900. As shown, main proxy server 903 includes storage medium 902 and communicates with image server 901 at a low bandwidth. The main proxy server 903, on the other hand, communicates with local proxy server 1 (906) and local proxy server 2 (907) over a high bandwidth network. Each proxy server, in turn, has its own storage medium, namely storage medium 904 and storage medium 905. Furthermore, local proxy server 1 communicates with end users 1 through N (designated 908) over a low bandwidth communications network and local proxy server 2 communicates with end users 1 through N (designated 909) over a separate low bandwidth communications network.

System 900 permits a less busy local proxy server to fulfill requirements of multiple users over a low bandwidth network, whereas a more busy main proxy server provides faster data to each local proxy server over a high bandwidth communications network. As previously described, each proxy server (main proxy server and local proxy servers) includes its own storage medium. In this manner, each proxy server may combine data that includes a first portion found in its own storage medium and a remaining portion requested from another server. For example, main proxy server 903 requests additional data from image server 901. Local proxy server 1, for example, requests additional data from main proxy server 903.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A server for fulfilling region and time of interest (RTI) requests for images from multiple users, the server comprising a receiver for receiving multiple RTI requests from multiple users, a processor for assembling a respective compressed image based on a respective RTI request from a respective user, and a transmitter for transmitting the respective compressed image to the respective user, wherein the processor is configured to extract a first portion of the respective compressed image from a storage device, and if the first portion is insufficient to fulfill the respective RTI request, the processor is configured to request a second portion of the respective compressed image from another server, and combine the first and second portions of the respective compressed image to fulfill the respective RTI request from the respective user, and when a first user requests a first RTI request and a second user requests a second RTI request, the processor is configured to (a) determine there are overlapping image data being requested in the first and second RTI requests, (b) request the overlapping data only once from the other server, (c) receive the overlapping image data from the other server, and (d) fulfill the first and second RTI requests simultaneously by including the overlapping image data in respective first and second compressed images transmitted to the first and second users.

2. The server of claim 1 wherein the respective compressed image includes an image compressed by JPEG 2000 compression technique, and the server includes a JPEG 2000 interactive protocol (JPIP) for communicating with the respective user.

3. The server of claim 1 wherein the respective RTI request includes at least one region of an image having a hierarchical order of resolution and a hierarchical order of quality, and the processor is configured to combine the first and second portions of the respective compressed image for including the at least one region and the order of resolution and the order of quality.

4. The server of claim 3 wherein the processor is configured to add a header field to the combined first and second portions of the respective compressed image.

5. The server of claim 1 wherein
the other server is configured to receive image data from a capture device, and provide the image data from the capture device as the second portion of the respective compressed image.

6. The server of claim 5 wherein
the other server is (a) directly connected to the capture device, (b) configured to obtain image data directly from the capture device, and (c) configured to compress the image data using JPEG 2000 protocol, and
the other server packages the respective compressed image to include the second portion of the respective compressed image.

7. The server of claim 1 wherein
the respective RTI request includes a geographic location of a region of interest, and
the processor is configured to select at least one region of an image corresponding to the geographic location of the region of interest.

8. The server of claim 1 wherein
the respective RTI request includes a request for image data of a moving target, and
the processor is configured to select at least one region of an image corresponding to the image data of the moving target.

9. A system for fulfilling region and time of interest (RTI) requests from multiple users comprising
at least two separate servers, including first and second servers,
wherein the first server is configured to communicate with an imaging capture device and compress image data, and
the second server is configured to communicate with the first server and at least two users; and
a processor is disposed in the second server for assembling a compressed image based on first and second RTI requests from first and second users respectively;
wherein the processor is configured to extract a first portion of the compressed image from a storage device, and
if the first portion is insufficient to fulfill the first RTI request, the processor is configured to request a second portion of the compressed image from the first server, and combine the first and second portions of the compressed image to fulfill the first RTI request, and
the processor is configured to
(a) determine there are overlapping image data being requested in the first and second RTI requests,
(b) request the overlapping data only once from the first server,
(c) receive the overlapping image data from the first server, and
(d) fulfill the first and second RTI requests simultaneously by including the overlap ping image data in respective first and second compressed images transmitted to the first and second users.

10. The system of claim 9 wherein
the compressed image includes an image compressed by JPEG 2000 compression technique, and
the second server includes a JPEG 2000 interactive protocol (JPIP) for communicating with the first and second users.

11. The system of claim 9 wherein
the respective RTI request includes at least one region of an image having a hierarchical order of resolution and a hierarchical order of quality, and
the processor is configured to combine the first and second portions of the compressed image for including the at least one region and the order of resolution and the order of quality.

12. The system of claim 11 wherein
the processor is configured to add a header field to the combined first and second portions of the compressed image.

13. The system of claim 9 wherein
the first server is (a) directly connected to the capture device, (b) configured to obtain image data directly from the capture device, and (c) configured to compress the image data using JPEG 2000 protocol.

14. The system of claim 9 wherein
the respective RTI request includes a geographic location of a region of interest, and
the processor is configured to select at least one region of an image corresponding to the geographic location of the region of interest.

15. The system of claim 9 wherein
the respective RTI request includes a request for image data of a moving target, and
the processor is configured to select at least one region of an image corresponding to the image data of the moving target.

16. A method for fulfilling region and time of interest (RTI) requests for images from multiple users comprising the steps of:
(a) receiving a first RTI request from a first user;
(b) assembling a compressed image based on the first RTI request; and
(c) transmitting the compressed image to the first user;
wherein step (b) includes
(i) extracting a first portion of the compressed image from a local storage device, and
(ii) requesting a second portion of the compressed image from another server, if the first portion is insufficient to fulfill the first RTI request, and
(iii) combining the first and second portions of the compressed image to fulfill the first RTI request from the first user, and
the method includes the following additional steps:
(d) receiving a second RTI request from a second user, wherein the second RTI request includes a second resolution of an image and the first RTI request includes a first resolution of the same image, and the second resolution is higher than the first resolution;
(e) requesting the image from the other server only at the second resolution; and
(f) after receiving the image in step (e), transmitting the image at the second resolution to the second user, and transmitting the same image at the first resolution to the first user.

17. The method of claim 16 wherein
step (b) includes assembling the compressed image in a JPEG 2000 format, and
step (c) includes transmitting the compressed image using a JPEG 2000 interactive protocol (JPIP) for communicating with the first and second users.

18. The method of claim 16 wherein
step (a) includes receiving the first RTI request for at least one region of an image having a hierarchical order of resolution and a hierarchical order of quality, and step (b) includes combining the first and second portions of the compressed image to include the at least one region and the order of resolution and the order of quality.

19. The method of claim 16 wherein step (a) includes receiving the first RTI request for a geographic location of a region of interest, and step (b) includes selecting at least one region of an image corresponding to the geographic location of the region of interest.

\* \* \* \* \*